May 24, 1932. W. L. ANGEL 1,859,548
GAUGE FOR PRINTING PRESSES
Filed April 25, 1929
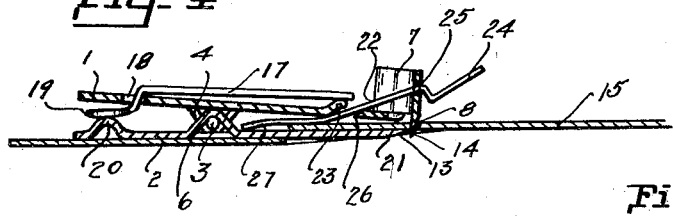
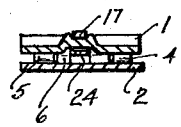
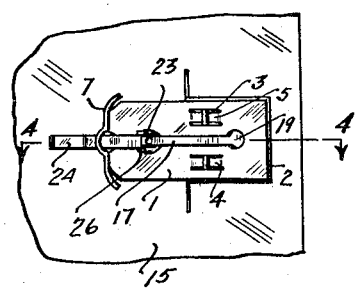
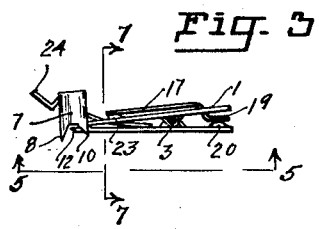
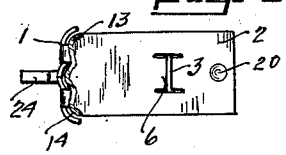
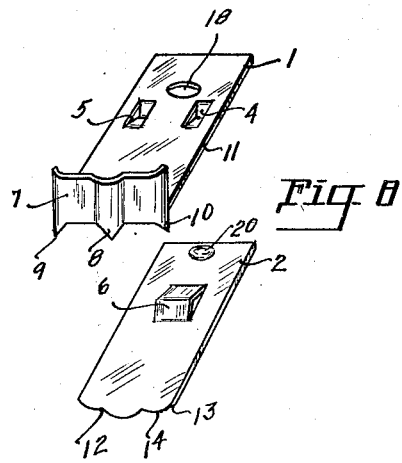
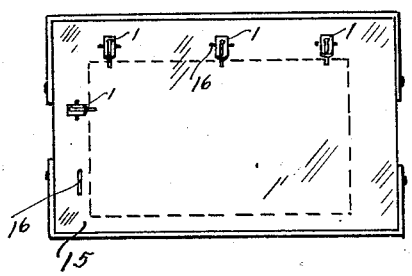
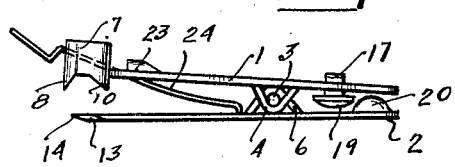
William L. Angel
INVENTOR
BY
ATTORNEY Patented May 24, 1932

1,859,548

UNITED STATES PATENT OFFICE

WILLIAM L. ANGEL, OF PORTLAND, OREGON

GAUGE FOR PRINTING PRESSES

Application filed April 25, 1929. Serial No. 358,024.

My invention relates to gauges for printing presses, the purpose and object of which is to align the paper in precise position relative to the platen upon which the printing is to be done.

One of the objects of my invention resides in a construction in a device that may be easily and quickly applied, that is self-contained, that is self-locking, and that will occupy a minimum of space, and be of minimum first cost.

A further object of my invention resides in the construction that permits of the slitting of the platen paper by the device, when the paper is stretched over the platen of the printing press. After the platen paper is slitted the device is then placed in the precise location within the slit to locate the paper to be printed upon.

Heretofore in the constructions employed, there has been a tendency for the sheet of paper to engage under the gauge, therefore preventing the precise positioning and location of the paper relative to the type and to the gauge. It has also been necessary to make the slit for the gauge by a pen knife or by other means, but through the use of my device the slit in the tympan sheet is made by the gauge itself and after the slit has been made the gauge may then be placed in precise position and clamped by the clamping element disposed within the gauge itself.

A further object of my new and improved gauge consists in a device that may be easily adjusted when placed in precise position, one that will prevent the paper to be printed from engaging beneath the stop wall of the gauge and one that may be made relatively cheap in first cost.

With these and incidental objects in view, the invention consists in certain novel features of construction and combination of parts the essential elements of which are set forth in the appended drawings, and a preferred form of embodiment of which is hereinafter shown with reference to the drawings which accompany and form a part of this specification.

In the drawings:

Fig. 1 is a top plan view of one of my devices in place and positioned upon a platen sheet of the printing press.

Fig. 2 is a front end view of the mechanism illustrated in Fig. 1.

Fig. 3 is a side view of the mechanism illustrated in Fig. 1.

Fig. 4 is a cross section view, taken on line 4—4 of Fig. 1, looking in the direction indicated.

Fig. 5 is an inverted plan view of the mechanism illustrated in Fig. 3, the same being taken on line 5—5 of Fig. 3, looking in the direction indicated.

Fig. 6 is a side view of the assembled device, the same being illustrated in normal, open position, for insertion within the slit of the platen sheet.

Fig. 7 is a cross section view, taken on line 7—7 of Fig. 3, looking in the direction indicated.

Fig. 8 is a perspective end view of the two body portions of the gauge.

Fig. 9 is a top plan view of a platen printing press illustrating the platen sheet stretched within the tympan clamps of the platen and illustrating four of my gauges in place upon the platen sheet.

Like reference characters refer to like parts throughout the several views.

I preferably form my device of two body elements 1 and 2 and hinge the same together about a central journal pin 3. Hinging ears 4 and 5 being formed in the body element 1, and the hinging ear 6 being formed in the body element 2. The width of the hinging ear 6 being sufficient to form a precise working relationship between the spaced ears 4 and 5 formed within the oppositely disposed body element, so that when the hinging ear 5 is placed in position, as illustrated in Fig. 6, a device is formed that will articulate in precise alignment caused by the engaging of the side walls of the respective hinging ears. A stop head 7 is formed on the front end of the body element 1, having a downwardly extending central stop 8 formed therein, and having side walls 9 and 10. The stop head 7 and the body element 1 are made from a single piece of material and is so shaped that when the stop head 7 is formed substantially vertical to that of the body portion; the stop portions 8, 9, and 10 will extend below the lower surface 11 of the body element 1. The body element 2 being formed of a double reverse curve 12, beveled on its lower side, as illustrated at 13 to form cutting edges 14 disposed at each corner.

When it is desire to place the gauge within the tympan sheet 15, the cutting edge 14 may be used to cut the slit 16 in the tympan paper through which the gauge is to be placed. During the slitting and placing of the gauge in position the gauge is in open position as illustrated in Fig. 6. A clamping lever 17, is rotatably mounted relative to the body element 1. The placing of the lever 17 through an opening 18 disposed in the body element 1 so that the camming surface 19 of the camming lever 17 may be made to engage upon the camming surface 20 upwardly extending from the body element 2. Camming surfaces 19 and 20 engage each other. The body elements 1 and 2 are partially rocked about the journal pin 3 until the tympan sheet 15 is held between the ends 21 and 22 of the body elements 1 and 2. With the stop wall 8 of the body element 1, engaging or piercing the platen paper so that it is impossible for the sheet to be printed going beyond the stop wall 8 or passing thereunder. A stop notch 23 upwardly extends from the body element 1 against which the camming lever 17 may come to rest and be held locked relative to the body element 1. A guide bar 24 passes through an opening 25 disposed within the stop wall 8 and passes through the opening 26 in the body element 1 and comes to rest upon the upper surface of the body element 2. The guide bar may be relatively locked in position 1 and 2 by having the inner end of the guide engaging with one or the other of the body elements 1 and 2 or by securing the same by rivets or otherwise to either of the body elements.

I preferably make the guide bar 24 of spring material to afford flexibility to the guide bar.

While the form of mechanism herein shown and described is admirably adapted to fulfill the objects primarily stated, it is to be understood that it is not intended to confine the invention to the one form of embodiment herein shown in various forms, all coming within the scope of the claims which follow:

What I claim is:

1. In a device of the class described, the combination of a body element hingedly secured together by a journal pin seated within hinging ears formed from the body elements and outwardly extending therefrom, a stop head formed adjacent the end of one of the body elements, said head having a point formed on its lower surface and when in normal position adapted to extend below the surface base of the other of the body elements, means for maintaining one end of the body elements in spaced relation with each other, and a guide bar passing through an opening disposed within one of the body elements and resting upon the other of the body elements, said guide bar extending outwardly from the stop head in order to form a guide.

2. In a device of the class described, the combination of body elements hingedly secured together about a common journal pin, a stop head disposed upon one end of one of the body elements and extending beyond the adjacent end of the other of the body elements, the bottom surface of the head and the adjacent end of the other of the body elements being sharpened, lever means for maintaining the open end of the body elements in spaced relation, and a guide bar extending outwardly from the stop head.

3. In a device of the class described, top and bottom body elements, ears outwardly extending from each of the body elements and formed to register in alignment for a journal pin to pass therebetween, a camming surface outwardly extending from one of the body elements, a locking lever passing through an opening disposed through the other of the body elements, the inner end of said locking lever being adapted for engagement with the camming surface disposed thereupon, and, when in engagement therewith, to maintain the adjacent ends of the body elements in spaced relation with each other, a stop head formed upon one end of the upper of the body elements and a guide spring bar extending outwardly from the stop head.

4. A feed guide comprising a primary and a secondary body element, the primary body element having a pair of V shaped hinging ears extending outwardly therefrom and in spaced relationship, an opening disposed through said body element, a stop head formed integrally with and at right angles to said body element having a plurality of points disposed therebelow, said stop head having an opening disposed therethrough, the secondary body element having a V shaped hinging ear centrally disposed thereabove in registerable alignment with the ears disposed upon the primary body element, a cutting edge disposed upon one side of said body element, a camming surface disposed upon the other side body element, a journal pin hingedly connecting said body elements, a clamping lever having a camming surface disposed at one end adapted to coact with the camming surface disposed upon the secondary body element being disposed through the opening disposed within the primary body element, and a spring guide bar disposed through the stop head opening and through the primary body element.

WILLIAM L. ANGEL.